United States Patent
Zhang

(10) Patent No.: US 11,280,629 B2
(45) Date of Patent: Mar. 22, 2022

(54) METHOD FOR DETERMINING TRIP OF USER IN VEHICLE, VEHICULAR DEVICE, AND MEDIUM

(71) Applicant: BOE TECHNOLOGY GROUP CO., LTD., Beijing (CN)

(72) Inventor: Ying Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 342 days.

(21) Appl. No.: 16/655,651

(22) Filed: Oct. 17, 2019

(65) Prior Publication Data
US 2020/0300652 A1    Sep. 24, 2020

(30) Foreign Application Priority Data

Mar. 21, 2019  (CN) .......................... 201910217570.9

(51) Int. Cl.
| | |
|---|---|
| *G06K 9/00* | (2006.01) |
| *G01C 21/36* | (2006.01) |
| *G06Q 30/02* | (2012.01) |
| *G08G 1/123* | (2006.01) |
| *G07C 5/00* | (2006.01) |

(52) U.S. Cl.
CPC ..... *G01C 21/3602* (2013.01); *G06K 9/00288* (2013.01); *G06K 9/00832* (2013.01); *G06Q 30/0284* (2013.01); *G07C 5/008* (2013.01); *G08G 1/123* (2013.01)

(58) Field of Classification Search
CPC .... G01C 21/3602; G01C 21/32; G01C 21/26; G01C 21/30; G06K 9/00288; G06K 9/00832; G06Q 30/0284; G06Q 10/02; G07C 5/008; G08G 1/123; G07B 15/02

USPC .......................................................... 382/103
See application file for complete search history.

(56) References Cited

U.S. PATENT DOCUMENTS

| | | | | |
|---|---|---|---|---|
| 9,857,795 | B2* | 1/2018 | Gupta ................... | B60W 30/20 |
| 10,172,070 | B2* | 1/2019 | Tibbitts ................ | H04W 4/48 |
| 10,620,009 | B2* | 4/2020 | Cui ....................... | G01S 19/40 |
| 10,837,788 | B1* | 11/2020 | Kentley-Klay .... | G01C 21/3623 |

(Continued)

FOREIGN PATENT DOCUMENTS

| | | | |
|---|---|---|---|
| CN | 107798307 A | * | 3/2018 |
| CN | 107798307 A | | 3/2018 |

(Continued)

OTHER PUBLICATIONS

First Chinese Office Action from Chinese Patent Application No. 201910217570.9 dated Aug. 26, 2020.

(Continued)

*Primary Examiner* — Mahendra R Patel
(74) *Attorney, Agent, or Firm* — Dilworth & Barrese, LLP.; Michael J. Musella, Esq.

(57) ABSTRACT

The present application provides a method, a vehicular device, and a medium for determining a trip of a user in a vehicle. The method includes acquiring a first global image in the vehicle; determining a tracking feature of the user according to the first global image; determining a movement path of the user in the vehicle according to the tracking feature and at least one second global image in the vehicle; determining the trip of the user based on the movement path and travel information of the vehicle.

12 Claims, 4 Drawing Sheets

(56) References Cited

U.S. PATENT DOCUMENTS

| | | | | |
|---|---|---|---|---|
| 2007/0100862 | A1* | 5/2007 | Reddy | G06F 16/958 |
| 2007/0203639 | A1* | 8/2007 | Van Den Broeck | G01C 21/16 |
| | | | | 701/532 |
| 2012/0239293 | A1* | 9/2012 | Bhatt | G01C 21/00 |
| | | | | 701/469 |
| 2015/0219767 | A1* | 8/2015 | Humphreys | G01S 19/48 |
| | | | | 342/357.26 |
| 2017/0138752 | A1* | 5/2017 | Mermelstein | G08G 1/012 |
| 2018/0211541 | A1* | 7/2018 | Rakah | B60W 60/00253 |
| 2019/0064808 | A1* | 2/2019 | Dyer | G05D 1/0061 |
| 2019/0079519 | A1* | 3/2019 | Hwang | G06Q 50/30 |
| 2019/0271550 | A1* | 9/2019 | Breed | G08G 1/096725 |
| 2020/0223454 | A1* | 7/2020 | Fox | G06F 3/013 |
| 2020/0385014 | A1* | 12/2020 | Hanniel | B60W 60/001 |

FOREIGN PATENT DOCUMENTS

| | | |
|---|---|---|
| GN | 101957996 A | 1/2011 |
| GN | 104156983 A | 11/2014 |
| GN | 109299928 A | 2/2019 |

OTHER PUBLICATIONS

Li Jixiu et al. Statistics of Bus Disembarkation Based on SSD convolutional neural Network, from Computer System Application, Mar. 15, 2019.

* cited by examiner

METHOD FOR DETERMINING TRIP OF USER IN VEHICLE, VEHICULAR DEVICE, AND MEDIUM

CROSS-REFERENCE TO RELATED APPLICATION

The present disclosure claims the priority of a Chinese patient application No. 201910217570.9 filed on Mar. 21, 2019. Herein, the content disclosed by the Chinese patient application is incorporated in full by reference as a part of the present disclosure.

TECHNICAL FIELD

The present application relates to the field of public transportation technique, and more particularly, to a method for determining a trip of a user in a vehicle, a vehicular device, and a medium.

BACKGROUND

At present, when a user takes a public transportation such as a bus, the user can adopt the manner of card payment or cash payment for fare settlement when the user gets on or off the bus. In this process, the user's total trip can be determined by the time when the user swipes the card when the user gets on and off the bus, and the user's fare can be determined according to the distance of the user's trip. In another case, the user may verbally inform the attendant his desired trip, and the attendant manually calculates the fare that the user is required to pay.

Such trip determining method is less efficient during peak hours. Since the payment device for the cards requires certain response time, the process of swiping card by the user is likely to cause line queuing and blocking when people get on and off, which reduces the bus operation efficiency. The manner of the attendant manually determining the user's trip and calculates the fare is not accurate enough, and also requires more labor costs.

SUMMARY

According to one aspect of the present application, it is provided a method for determining a trip of a user in a vehicle, comprising: acquiring a first global image in the vehicle; determining a tracking feature of the user according to the first global image; determining a movement path of the user in the vehicle according to the tracking feature and at least one second global image in the vehicle; determining the trip of the user based on the movement path and travel information of the vehicle.

In some embodiments, determining the movement path of the user in the vehicle according to the tracking feature and at least one second global image in the vehicle comprises: for each of the at least one second global image, identifying a location of the user in the vehicle in the second global image based on the tracking feature, determining the movement path of the user in the vehicle by using user locations respectively identified in each of the at least one second global image.

In some embodiments, determining the trip of the user based on the movement path and travel information of the vehicle comprises: determining a first location at which the vehicle resides when the first global image is acquired as a start of the trip of the user.

In some embodiments, determining the trip of the user based on the movement path and travel information of the vehicle comprises: determining a second location at which the vehicle resides when the movement path of the user terminates in the vehicle as an end of the trip of the user.

In some embodiments, determining the trip of the user based on the movement path and travel information of the vehicle comprises: determining an end of the trip in response to a geographic location inputted by the user.

In some embodiments, the method further comprises: acquiring a local image of the user in the vehicle; determining an identity feature of the user based on the local image; and determining a user identification associated with the user based on the identity feature.

In some embodiments, the method further comprises: associating the trip of the user with the user identification.

According to another aspect of the present application, it is provided a vehicular device for a public transportation, comprising: an image acquisition device configured to acquire a first global image in the vehicle; an onboard computer configured to perform the following steps: determining a tracking feature of the user according to the first global image; determining a movement path of the user in the vehicle according to the tracking feature and at least one second global image in the vehicle; determining the trip of the user based on the movement path and travel information of the vehicle.

In some embodiments, determining the movement path of the user in the vehicle according to the tracking feature and at least one second global image in the vehicle comprises: for each of the at least one second global image, identifying a location of the user in the vehicle in the second global image based on the tracking feature, determining the movement path of the user in the vehicle by using user locations respectively identified in each of the at least one second global image.

In some embodiments, determining the trip of the user based on the movement path and travel information of the vehicle comprises: determining a first location at which the vehicle resides when the first global image is acquired as a start of the trip of the user.

In some embodiments, determining the trip of the user based on the movement path and travel information of the vehicle comprises: determining a second location at which the vehicle resides when the movement path of the user terminates in the vehicle as an end of the trip of the user.

In some embodiments, determining the trip of the user based on the movement path and travel information of the vehicle comprises: determining an end of the trip in response to a geographic location inputted by the user.

In some embodiments, the onboard computer is further configured to: acquire a local image of the user in the vehicle; determine an identity feature of the user based on the local image; and determine a user identification associated with the user based on the identity feature.

In some embodiments, the onboard computer is further configured to: associate the trip of the user with the user identification.

According to yet another aspect of the present application, it is provided an electronic device, comprising a memory, a processor, and a program stored on the memory and executable on the processor, wherein one or more steps of the method mentioned above are implemented when the processor executes the program.

According to yet another aspect of the present application, it is provided a computer-readable storage medium having stored thereon a computer program, wherein steps of the method mentioned above are implemented when the program is executed by a processor.

By adopting the method, the vehicular device, and the medium for determining a trip of a user in a vehicle provided by the present application, the global image in the vehicle can be acquired, and the user's trip can be automatically determined by tracking the movement path of the user in the global image, thereby the efficiency of determining the user's trip in public transportation can be improved.

BRIEF DESCRIPTION OF THE DRAWINGS

In order to explain the present application more clearly, the present application will be further described below in conjunction with the preferred embodiments and the accompanying drawings. Similar components in the drawings are denoted by the same reference signs. It should be understood by a person skilled in the art that the following detailed description is intended to be illustrative, not restrictive, and should not be understood as limiting the protection scope of the present application.

DETAILED DESCRIPTION OF THE EMBODIMENTS

Figure 1A:
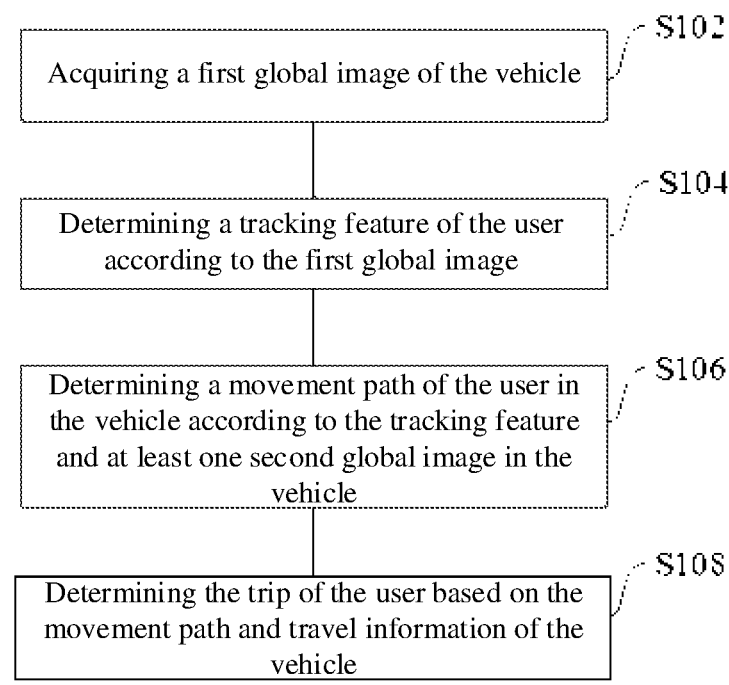
FIG. 1A shows a flowchart of a method for determining a trip of a user in a vehicle provided according to some embodiments of the present application.

To make the objectives, technical solutions, and advantages of the embodiments the present application more clear, technical solutions of the embodiments of the present application will be described fully and comprehensively with reference to the drawings thereof. Obviously, these described embodiments are only part of the embodiments of the present application, rather than all of the embodiments of the present application. All other embodiments obtained by a person of ordinary skill in the art without paying inventive efforts should all fall into the protection scope of the present application.

Unless otherwise defined, technical terms or scientific terms used herein shall have common meaning known by a person of ordinary skill in the art of the present application. Words and expressions such as "first", "second" and the like used in the specification and claims of the present application do not denote any sequence, quantity or priority, but are only used to distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections. Words such as "up", "below", "left", "right", etc., are only used to denote relative positional relationship, once an absolute position of the described object changes, the relative positional relationship may probably change correspondingly.

The public transportation referred to in the present application means vehicles, boats, and the like that are used by a plurality of users in public transport, including but not limited to buses, subways, rails, trolley buses etc. In some implementations, the public transportation travels along a pre-specified path and stops at a plurality of sites. At each of the plurality of sites, the user can get on or off the transportation.

For the convenience of illustrative description, the process of the method provided by the present application will be described by taking bus as an example in the following embodiments. It is easy to understand that the method provided by the present application can also be applied to other public transportation or the like.

The user feature referred to in the present application means physiological features that can be used to identify user information. For example, user's eye iris, user's limb bone distribution, user's face, user's palm print, user's fingerprint, user's accent, or the like. For the sake of illustrative convenience, facial features (face features) of the user are described as an example in the following embodiments.

The user terminal and/or the attendant terminal involved in the present application may be a vehicular terminal installed at one or more fixed positions in a public transportation, or may be a handheld mobile terminal held by the attendant. The operation mode of the fare settlement terminal is not particularly limited. For instance, NFC, two-dimensional code, radio frequency, etc. all can be applicable to the present application.

In the present application, the image acquisition device may be a camera based on imaging elements such as CCD, CMOS, etc., and the imaging thereof may be planar imaging, and may also be stereo imaging such as TOF, or RGB-D imaging with depth information.

As shown in FIG. 1A, embodiments of the present application provide a method for determining a trip of a user in a vehicle.

In step S102, a first global image in the vehicle may be acquired. In some embodiments, a global image refers to an image in which an overall condition in the vehicle can be captured. With such a global image, users located at various locations in the vehicle can be captured. In some implementations, the global image may be acquired with a plurality of image acquisition devices respectively disposed at different locations of the vehicle. For example, data of the first global image may be acquired using a plurality of image acquisition devices respectively disposed at different locations of the vehicle. In some embodiments, the first global image may be a global image acquired when users enter the vehicle.

In step S104, a tracking feature of the user may be determined according to the first global image. The tracking feature is a feature for identifying a corresponding user in a global image. In some embodiments, the user's tracking feature may refer to physiological features of the user and may also refer to image features used to identify the user in the global image. For example, non-physiological features such as characteristics of clothing, accessories, and the like worn by the user may also be determined as the tracking feature of the user. In fact, any feature that can be used in the global image to identify the location of the user in the global image can be determined as the tracking feature. Here, the present application makes no limitations to the specific form of the tracking feature.

In step S106, a movement path of the user in the vehicle may be determined according to the tracking feature and at least one second global image in the vehicle. The at least one second global image may be a global image acquired after the user enters the vehicle.

After determining the tracking feature of the user to be tracked according to the first global image, at least one second global image may be acquired. The movement path of the user in the vehicle may be determined based on the tracking feature and the at least one second global image.

For example, the at least one second global image may be acquired by an image acquisition unit disposed in the vehicle. In one implementation, the image acquisition unit may be used to acquire a plurality of second global images at a preset frequency. For example, the at least one second global image may be continuous image frames of a video acquired using an image acquisition unit. In another implementation, acquiring the second global image may also be triggered in response to a preset event. For example, acquiring the second global image may also be triggered in response to the user passing through a preset location.

The user to be tracked may be identified in each of the second global images based on the tracking feature determined using the first global image, and the location of the user to be tracked is determined. The movement path of the user in the vehicle can be determined by using the capture time of each second global image and the location of the user in each second global image. With such a method, real-time tracking of the user can be achieved.

In step S108, the trip of the user may be determined based on the movement path and travel information of the vehicle.

In some embodiments, a start of the trip of the user may be determined to be a first location where the vehicle resides when the first global image is acquired. For example, when the vehicle arrives at a station at a first location, the user enters the vehicle and starts the trip.

In some embodiments, an end of the trip may be determined to be a second location where the vehicle resides when the movement path of the user terminates in the vehicle.

In one implementation, when the tracking feature of the user is no longer recognized in the second global image, it can be determined that the movement path of the user terminates in the vehicle. At this moment, it can be considered that the user has left the vehicle. Thus, the end of the trip can be determined as the second location where the vehicle resides when the movement path of the user terminates in the vehicle.

In some implementations, if the user disappears in the global image frame when the public transportation enters and leaves a stop while real-time tracking of the user is performed using the global image, the user's trip can be estimated according to the location of the vehicle at the time when the user disappears in the global image.

By adopting this implementation, accuracy of judgment of whether the user gets off the vehicle by real-time tracking can be improved, thereby estimation accuracy of the user's trip is improved.

In another implementation, if the user is identified again in the second global image before the vehicle arrives at the end of a preset travel route, it may be considered that the user is not previously detected because of being obstructed by an obstacle, instead of having got off. In this case, the user may continue to be tracked, and the movement path of the user may be determined as terminated in the vehicle when the next time that the tracking feature of the user is no longer recognized in the second global image.

In yet another implementation, the end of the trip may also be determined in response to a geographic location inputted by the user. For example, the user may input the time or location of when he gets off from the vehicle through a user terminal (e.g., a mobile electronic device with an application installed, such as a cell phone, notebook, etc.). The end of the trip can be determined based on the information inputted by the user.

In some embodiments, the method 100 illustrated in FIG. 1A may also comprise obtaining a local image of the user in the vehicle. An identity feature of the user can be determined based on the local image. The identity feature may be a feature associated with identity information of the user. For example, the identity feature may be a facial feature of the user associated with user identification of the user. Further, a user identification associated with the user can be determined based on the identity feature. In some embodiments, the local image may be a go-aboard position image in the public transportation. By taking a local image of the user at the go-aboard position, the user's user identification can be determined based on the local image. The user identification can be displayed in a global image to help the user confirm the user's own identity in the global image.

For example, user identification is performed in local in the go-aboard position image. If the user going aboard is identified from the go-aboard position image and a facial feature is recognized, the image frame including the facial feature is sent to a remote server for face matching so as to obtain user information, and if the remote server successfully acquires the user information, then the user in the global image (e.g., the first global image) taken while capturing the go-aboard position is marked at a local end based on the user information. Thereafter, the user can be tracked in real time based on the global image (e.g., at least one second global image).

For example, the user being marked in local in the global image according to the user information may be a result of user feature (not limited to the user's facial feature, may also be the clothes, the hat, and the backpack features) comparison performed between two identification results after user identification is performed in local on the go-aboard position image and the global image respectively.

In the embodiments provided by the present application, the local end refers to a public transportation end or a vehicular device end of the public transportation, and it is referred relative to a remote server end. Communications between the local end and the server end can be realized in various manners, such as wireless wide area network (WWAN, which may be implemented through wireless communication networks such as 3G, 4G, and 5G,) wireless broadband (which can be implemented by for example WiMAX).

In some examples, the remote server end performing face matching to obtain the user information further comprises: comparing the image frame that includes the facial feature with the face image of the registered user stored in the facial feature database for facial feature matching, so as to obtain the user information. The user terminal may be a mobile terminal of the user, the user can register by using an application installed on the mobile terminal, the registered information is saved on a remote server end, and the registered information includes but not limited to the user's face image, account number, name, mobile phone number, and payment method.

If the user going aboard is identified from the go-aboard position image and the facial feature is not recognized or the remote server side fails to successfully acquire the user information, then the determined trip and/or the fare information determined based on the trip cannot be sent to the user terminal of the user. At this time, the vehicular terminal and/or the attendant terminal can be notified to determine the user's trip manually.

After determining the user's trip by using the above method provided by the present application, settlement may be further performed for the determined trip of the user.

Figure 1B:
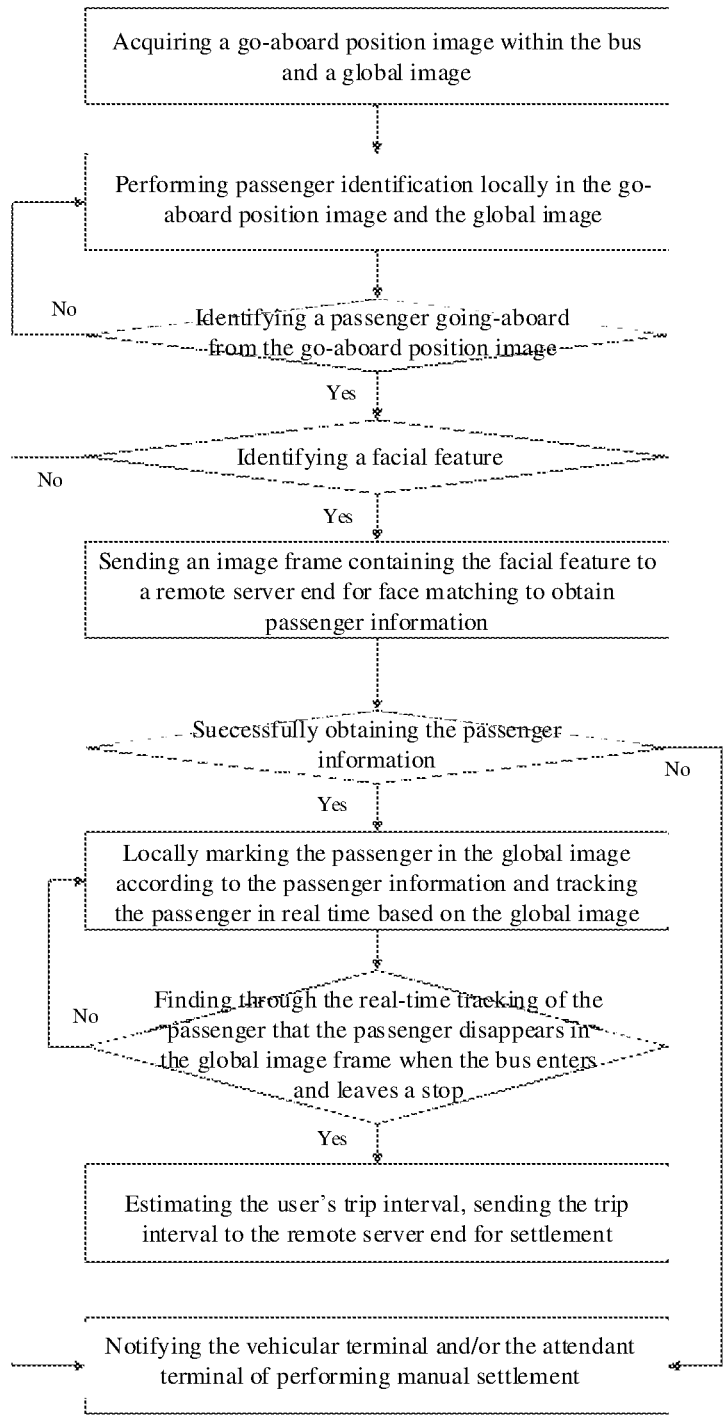
FIG. 1B shows a schematic flowchart of a settlement method based on the trip of the user according to some embodiments of the present application.

FIG. 1B shows a schematic flowchart of a settlement method based on the trip of the user according to some embodiments of the present application.

As shown in FIG. 1B, a local image of the go-aboard position in the bus and a global image of the bus can be acquired. The local end device can be used to perform identification in the local image of the go-aboard position and the global image so as to determine if the images include a go-aboard passenger.

If the passenger going aboard is identified in the go-aboard position image, the facial feature of the passenger can be determined based on the go-aboard position image. If the passenger going aboard is not identified from the go-aboard position image, a new go-aboard position image can be acquired to perform passenger identification.

Image frames containing facial features can then be sent to a remote server for face matching to determine passenger information, such as the passenger's user identification.

If the passenger information is successfully obtained from the remote server, the passenger in the global image can be marked at the local end based on the passenger information and the passenger can be tracked in real time based on the global image. For example, if it is found during the real-time tracking that the passenger disappears in the global image frame when the bus enters and leaves a stop, the passenger's trip interval can be determined based on the location of the bus when the passenger disappears in the global image.

In some embodiments, the calculated passenger's trip interval may be sent to a remote server for settlement.

In some embodiments, the user's trip may be associated with the user's user identification. In some implementations, the fare that the user should pay can be determined based on the determined trip of the user, and the fare to be paid is sent to the user terminal of the user. In other implementations, the determined trip may also be sent to the user terminal of the corresponding user. For example, the user terminal can be utilized to determine the fare that the user should pay based on the determined trip.

After the settlement is completed, the remote server can send a settlement result to the user terminal, the user confirms and thereafter conducts mobile payment, or user's pre-deposit can be automatically deducted after the settlement is completed.

In other embodiments, if the passenger's facial feature cannot be obtained, or the remote server cannot successfully obtain the passenger information, the remote server can notify the vehicular terminal and/or the attendant terminal to conduct a manual settlement.

For example, the user going aboard identified in the go-aboard position image may be marked and sent to the vehicular terminal and/or the attendant terminal to transmit a settlement notification to the user and/or the attendant. The vehicular terminal may be a vehicular display, and the attendant terminal may be the attendant's mobile terminal. For example, in response to receiving a settlement notification, the user may perform manual settlement through the user terminal. In response to the user completing the settlement, a settlement completion notification may be sent to the remote server. After the remote server confirms that the user has completed the settlement, a settlement result may be returned to the user terminal to enable the user to obtain an autonomous settlement certificate that can be presented to the attendant. For another example, in response to receiving the settlement notification, the attendant can see the user marked in the go-aboard position image that has not successfully performed automatic bus settlement, so that the user can be notified to perform manual settlement through the user terminal or by swiping a bus card or conducting cash payment for settlement. Here, the attendant refers to the driver or the ticket seller. It is understandable that the attendant may also register through the application of his mobile terminal. The attendant's registration information can be stored on the remote server side. The attendant's registration information includes but not limited to public transport number plates and lines.

In some embodiments, when performing the settlement based on the determined user's trip, after receiving the trip information transmitted by the user terminal, the remote server may perform settlement based on the trip information and return a settlement result to the user terminal.

In this case, the user can check through the user terminal whether the remote server receives the user information, thereby determining whether the fare for the trip can be automatically settled. If the remote server fails to obtain the user information due to unsuccessful face matching, bus automatic settlement cannot be performed accordingly, the user can perform manual settlement through the user terminal and can present the settlement result returned by the remote server to the user terminal to the attendant as a proof of settlement.

Further, the remote server end may directly return the settlement result to the vehicular terminal and/or the attendant terminal after settlement is performed based on the user's trip and the user information, instead of the user presenting the certificate by himself. In addition, when the user is tracked in real time based on the global image, the global image containing the user may be uploaded to the remote server as a key frame, and the remote server may send the key frame containing the user to the user terminal for the user to check and verify.

In some embodiments, when the settlement is performed based on the determined user's trip, the remote server may determine the user's trip based on positioning information (e.g., GPS positioning information) associated with the user and sent by the user terminal, and the settlement may be performed based on the trip determined based on the positioning information and the settlement result is sent to the user terminal.

In this case, if the user thinks that the settlement result received by the user terminal is incorrect, the user terminal's positioning information may be used as evidence for appeal, a new settlement result is sent to the user terminal after the remote server side verifies and conduct the settlement again. The payment is made after the user confirms. Further, the remote server end may also send a face image of the corresponding user to the vehicular terminal and/or the attendant terminal to be displayed in association with the new settlement result so as to inform the attendant.

With the method for determining a trip of a user in a vehicle provided by the present application, the trip of the user in the vehicle can be automatically determined based on face recognition and target tracking, thus automatic settlement of the vehicle fare can be achieved, so that settlement efficiency is improved and line queuing and blocking at the time of getting on and off caused by the user's card swiping or cash payment can be avoid, which improves smoothness of the user getting on and off the vehicle. The facial feature recognition and the target tracking involved in the method provided by the present application are all implemented at the local end, so that the problem of excessive interactive data transmission with the remote server end and delay can be avoided. In addition, with the method provided by the present application, it is also possible to solve the problem that the facial feature cannot be successfully recognized because the user does not show a complete facial feature (for example, wearing a hat or a mask in winter).

Figure 2:
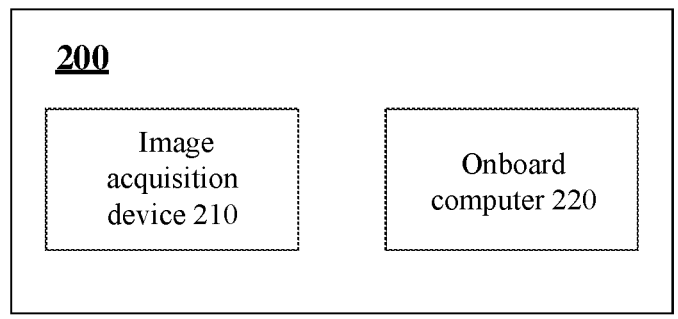
FIG. 2 shows a schematic block diagram of a vehicular device for a public transportation according to some embodiments of the present application.

FIG. 2 shows a schematic block diagram of a vehicular device for a public transportation according to some embodiments of the present application.

As shown in FIG. 2, the vehicular device 200 may comprise an image acquisition device 210 and an onboard computer 220. The image acquisition device 210 may be configured to acquire a first global image in the vehicle. In some implementations, the global image may be acquired with a plurality of image acquisition devices respectively disposed at different locations of the vehicle. For example, data of the first global image may be acquired using a plurality of image acquisition devices respectively disposed at different locations of the vehicle. In some embodiments, the first global image may be a global image acquired when users enter the vehicle.

The onboard computer 220 may be configured to determine a tracking feature of the user according to the first global image.

Further, the onboard computer 220 may be configured to determine a movement path of the user in the vehicle according to the tracking feature and at least one second global image in the vehicle.

For example, the at least one second global image may be acquired by an image acquisition unit disposed on the vehicle. In one implementation, the image acquisition unit may be used to acquire a plurality of second global images at a preset frequency. For example, the at least one second global image may be continuous image frames of a video acquired using an image acquisition unit. In another implementation, acquiring the second global image may also be triggered in response to a preset event. For example, acquiring the second global image may be triggered in response to a time when the user passes through a preset location.

The user to be tracked may be identified in each of the second global images based on the tracking feature determined using the first global image, and the location of the user to be tracked is determined. The movement path of the user in the vehicle can be determined by using the capture time of each second global image and the location of the user in each second global image. With such a method, real-time tracking of the user can be achieved.

The at least one second global image may be a global image acquired after the user enters the vehicle. Further, the onboard computer 220 may determine the trip of the user based on the movement path and travel information of the vehicle.

In some embodiments, a start of the trip of the user may be determined to be a first location where the vehicle resides when the first global image is acquired. For example, when the vehicle arrives at a station at a first location, the user enters the vehicle and starts the trip.

In some embodiments, an end of the trip may be determined to be a second location where the vehicle resides when the movement path of the user terminates in the vehicle.

In one implementation, when the tracking feature of the user is no longer recognized in the second global image, it can be determined that the movement path of the user terminates in the vehicle. At this moment, the user may be considered to have left the vehicle. Thus, the end of the trip can be determined as the second location where the vehicle resides when the movement path of the user terminates in the vehicle.

In some implementations, if the user disappears in the global image frame when the public transportation enters and leaves a stop while performing real-time tracking of the user using the global image, the user's trip can be estimated according to the location of the vehicle at the time when the user disappears in the global image.

By adopting this implementation, accuracy of judging whether the user gets off the vehicle by real-time tracking can be improved, thereby estimation accuracy of the user's trip is improved.

In another implementation, if the user is identified again in the second global image before the vehicle arrives at the end of a preset travel route, it may be considered that the user is not previously detected because of being obstructed by an obstacle or the like, instead of having got off. In this case, the user may continue to be tracked, and the movement path of the user may be determined as terminated in the vehicle when the next time that the tracking feature of the user is no longer recognized in the second global image.

In yet another implementation, the end of the trip may also be determined in response to a geographic location inputted by the user. For example, the user may input the time or location of his departure from the vehicle through a user terminal (e.g., a mobile electronic device with an application installed, such as a cell phone, notebook, etc.). The end of the trip can be determined based on the information inputted by the user.

In some embodiments, the onboard computer 200 may be further configured to acquire a local image of the user in the vehicle. An identity feature of the user can be determined based on the local image. Further, user identification associated with the user can be determined based on the identity feature. In some embodiments, the local image may be a go-aboard position image in the public transportation. By taking a local image of the user at the go-aboard position, the user's user identification can be determined based on the local image. The user identification can be displayed in a global image to help the user confirm the user's own identity in the global image.

Figure 3:
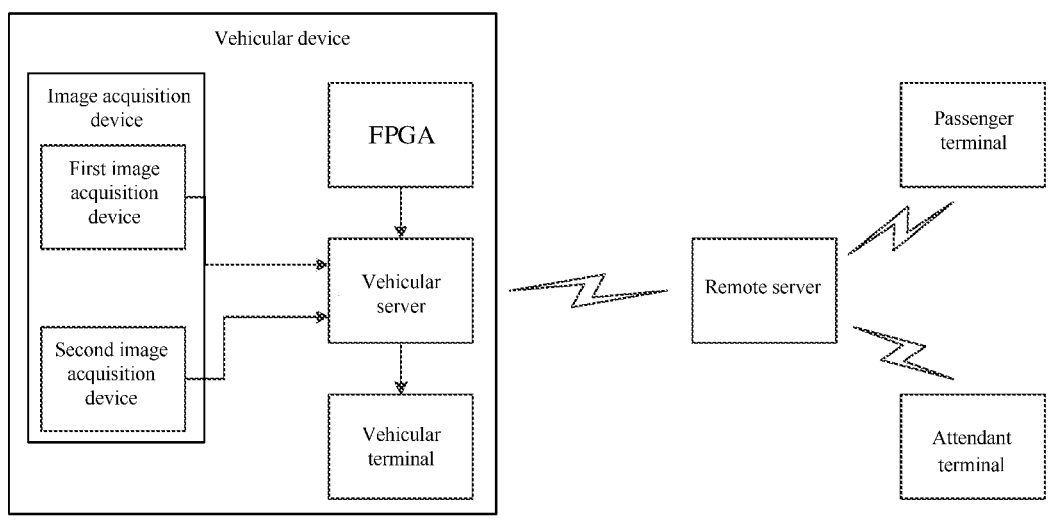
FIG. 3 shows a schematic diagram of a settlement system according to some embodiments of the present application.

FIG. 3 shows a schematic diagram of a settlement system according to some embodiments of the present application. As shown in FIG. 3, the settlement system may comprise a remote server, together with a vehicular device, a vehicular terminal, and/or an attendant terminal of the public transportation. The vehicular device may be implemented as the vehicle device 200 shown in FIG. 2, and details are not repeated herein.

The vehicular device may comprise at least one image acquisition device (such as the first image acquisition device and the second image acquisition device shown in FIG. 3) to capture a global image of the public transportation and/or a local image of the user, and can be used to track the user in real time based on the global image and determine the trip of the user. If the user going aboard is identified from the local image of the user but no facial feature is identified or no user information returned by the remote server is received, the vehicular terminal and/or the attendant terminal is notified of performing manual settlement. If it is found during the real-time tracking that the passenger disappears in the global image frame at the time when the bus enters and leaves a stop, the passenger's trip interval can be estimated, and the estimated trip interval of the passenger is sent to a remote server.

In some embodiments, the vehicular device can be used to estimate a trip interval of the user when it is found during the real-time tracking of the user that the user disappears at a location for getting off in the global image frame when the public transportation entering and leaving a stop, and send the trip interval to the remote server for settlement.

In this way, the accuracy of judging whether the user gets off by the on-board computer through real-time tracking can be improved, thereby the accuracy of estimating the trip interval of the user is improved.

In some embodiments, the vehicular device can be used to continue real-time tracking of the user when it is found by real-time tracking that the user disappears in the global image frame when the public transportation enters and leaves a stop and the user reappears in the subsequent global image frame.

In this way, it can be prevented that the on-board computer erroneously determines that the user has got off because the user is temporarily blocked, when the user is tracked in real time.

In some embodiments, the processing unit in the vehicular device can be implemented to be accelerated by a co-processor such as an FPGA, which can improve the running speed of the vehicular device and ensure timeliness and effectiveness of the function such as target tracking.

The remote server can be used for face matching to obtain user information, and sending the user information to the vehicular device after successfully obtaining user information. In some embodiments, the remote server is further configured to perform settlement based on the received trip interval.

In some embodiments, the remote server may be configured to push the user information to the user terminal, and after receiving the trip information sent by the user terminal, if the user information is not successfully acquired, the remote server may perform the settlement based on the trip information and return a settlement result to the user terminal.

In this way, the user can check whether the face matching is successful performed through the user terminal, and bus settlement can be automatically performed. If the bus automatic settlement cannot be performed due to unsuccessful face matching, the user can perform manual settlement through the user terminal, and the settlement result returned by the remote server to the user terminal can be presented to the attendant as a proof.

In some embodiments, the remote server may be further configured to perform the settlement again, and send a new settlement result to the user terminal after receiving information sent by the user terminal and including the location information and indicating that the user does not take the bus or the trip interval estimation is incorrect.

In this way, after the user checks the settlement result received by the user terminal, if it is considered that there is an error, the positioning information of the user terminal can be used as evidence to appeal, after the remote server verifies and performs the settlement again, and sends a new settlement result to the user terminal, the user confirms and then pays.

Figure 4:
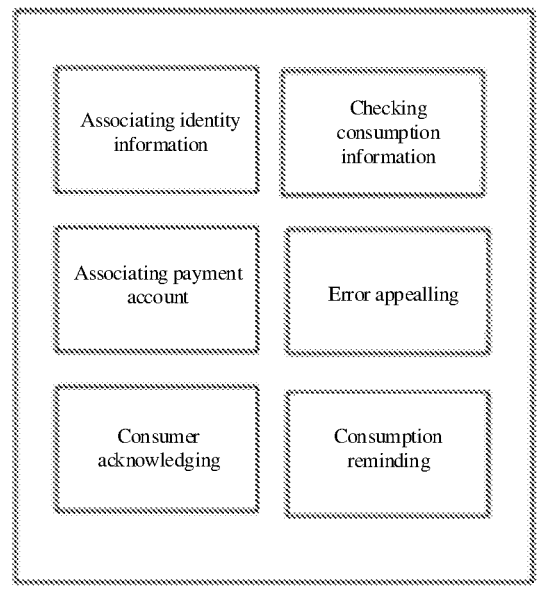
FIG. 4 shows a functional schematic diagram of an APP at a user terminal.

The user can send the trip information and the information including the location information and indicating that the user does not take the bus or the trip interval estimation is incorrect through the application of the user terminal, and the function of the application of the user terminal is as shown in FIG. 4.

It should be noted that the bus settlement system provided in this embodiments may be used for settlement of the user trip determined in the method for determining a trip of a user as shown in FIG. 2, as for related description, reference may be made to the description provided above, and details are not repeated herein.

With the bus settlement system provided by this embodiments, the trip of the user in the vehicle can be automatically determined based on face recognition and target tracking, thus automatic settlement of the vehicle fare can be achieved, so that settlement efficiency is improved and line queuing and blocking at the time of user getting on and off the bus caused by the user's card swiping or cash payment can be avoid, which improves smoothness of the user's getting on and off the vehicle. The facial feature recognition and the target tracking involved in the method provided by the present application are all implemented at the local end, so that the problem of excessive interactive data transmission with the remote server end and delay can be avoided. In addition, with the method provided by the present application, it is also possible to solve the problem that the facial feature cannot be successfully recognized because the user does not show a complete facial feature (for example, wearing a hat or a mask in winter).

Figure 5:
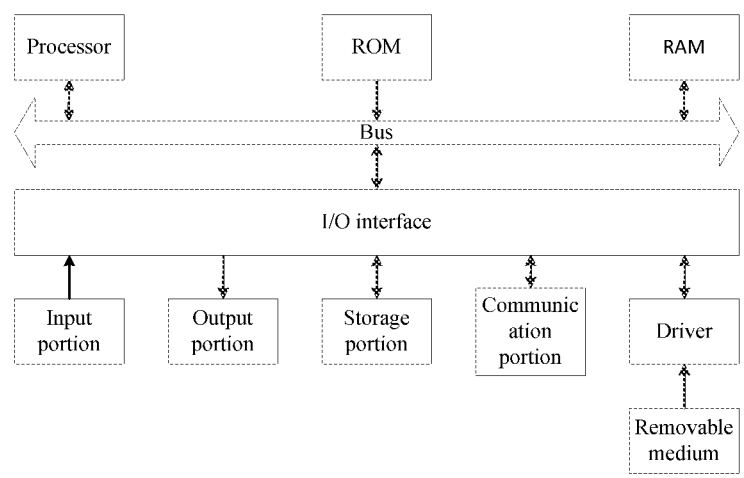
FIG. 5 shows a schematic structural diagram of an onboard computer according to some embodiments of the present application.

As shown in FIG. 5, a computer system suitable for implementing the on-board computer provided by this embodiments includes a processor that can perform various appropriate actions and processes according to a program stored in a read only memory (ROM) or according to a program loaded into a random access memory (RAM) from a storage portion. In RAM, various programs and data required for the operation of the computer system are also stored. The CPU, ROM, and RAM are connected via a bus. An input/input (I/O) interface is also connected to the bus.

The processor may be a central processing unit CPU, a digital processor DSP, a microcontroller MCU, an application specific integrated circuit ASIC, a programmable logic gate array FPGA, or the like.

The following components are connected to the I/O interface: an input portion including a keyboard, a mouse, etc.; an output portion including a liquid crystal display (LCD) or the like, a speaker, etc.; a storage portion including a hard disk or the like; and a communication portion of a network interface card including a LAN card, a modem, and the like. The communication section performs communication processing via a network such as the Internet. The driver is also connected to the I/O interface as needed. A removable medium such as a magnetic disk, an optical disk, a magneto-optical disk, a semiconductor memory or the like is mounted on the driver as needed so that a computer program read therefrom is installed into the storage portion as needed.

In particular, according to this embodiment, the process described in the above flowchart can be implemented as a computer software program. For example, this embodiment includes a computer program product comprising a computer program tangibly embodied on a computer readable medium, the computer program comprises program codes for executing the method illustrated in the flowchart. In such an embodiment, the computer program can be downloaded and installed from the network via the communication portion, and/or installed from a removable medium.

The flowcharts and block diagrams in the drawings illustrate the architecture, functionality and operation of possible implementations of systems, methods and computer program products according to various embodiments of the present invention. In this regard, each block in the flowcharts or block diagrams may represent a modular, program segment, or part of code, which comprises one or more executable instructions for performing the specified logic function(s). It should also be noted that, in some alternative implementations, the functions noted in the block may also occur in an order other than that noted in the drawings. For example, two blocks consecutively shown may, in fact, be performed substantially in parallel, or sometimes they may be performed in a reverse order, depending upon the functionality involved. It will also be noted that, each block of the block diagrams and/or flowcharts and combinations of blocks in the block diagrams and/or flowcharts, can be performed by using a special purpose hardware-based system that executes the specified functions or operations, or by using a combination of a special purpose hardware and computer instructions.

The units described in this embodiment may be implemented by software or by hardware. The described unit may also be provided in the processor, for example, it may be described as: a processor, including a facial feature recognition unit, a user real-time tracking unit, and the like. The names of these units do not in any way constitute a limitation on the unit itself. For example, the user real-time tracking unit may also be described as a "target tracking unit."

In another aspect, this embodiment further provides a non-volatile computer storage medium, which may be a non-volatile computer storage medium included in the foregoing device in the embodiment described above, also, it may be a non-volatile computer storage medium that exists alone and is not assembled into the terminal. The non-volatile computer storage medium stores one or more programs, when the one or more programs are executed by a device, the device is caused to: acquire an image of a go-aboard position image and a global image in a public transportation; perform user identification locally on the go-aboard position image and the global image; if the user going aboard is recognized from the go-aboard position image and the facial feature is recognized, send the image frame including the facial feature to the remote server for face matching so as to obtain user information; if the remote server successfully obtains the user information, locally mark the user in the global image according to the user information, and track the user in real time based on the global image; if the user going aboard is identified from the go-aboard position image and the facial feature is not recognized or the remote server side fails to successfully acquire the user information, notify the vehicular terminal and/or the attendant terminal to perform manual settlement; if it is found during the real-time tracking that the passenger disappears in the global image frame when the bus enters and leaves a stop, estimate the passenger's trip interval, and send the estimated trip interval of the passenger to a remote server for settlement.

It should be also noted that, in the specification, the relationship terms such as "first", "second", and so on are used only to differentiate one entity or operation from another entity or operation, not necessarily requiring or implying that these entities or operations have any of such actual relationships or sequences. And the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Obviously, the above-described embodiments of the present application are merely examples provided for clearly explaining the present application and are not intended to limit the implementation of the present application. For those of ordinary skill in the art, it is also possible to make various changes and modifications to the various embodiments based on the above description, it is unable to enumerate all the ways of the implementation, any obvious changes or modifications extended from the technical solutions of the present application all fall within the protection scope of the present application.

What is claimed is:

1. A method for determining a trip of a user in a vehicle, comprising:
    acquiring a first global image in the vehicle;
    determining a tracking feature of the user according to the first global image;
    determining a movement path of the user in the vehicle according to the tracking feature and at least one second global image in the vehicle;
    determining the trip of the user based on the movement path and travel information of the vehicle,
    wherein determining the movement path of the user in the vehicle according to the tracking feature and at least one second global image in the vehicle comprises:
    for each of the at least one second global image, identifying a location of the user in the vehicle in the second global image based on the tracking feature,
    determining the movement path of the user in the vehicle by using user locations respectively identified in each of the at least one second global image, and
    wherein determining the trip of the user based on the movement path and travel information of the vehicle comprises:
    determining a first location at which the vehicle resides when the first global image is acquired as a start of the trip of the user, and
    determining a second location at which the vehicle resides when the movement path of the user terminates in the vehicle as an end of the trip of the user, and
    the method further comprising:
    acquiring a local image of the user in the vehicle;
    determining an identity feature of the user based on the local image; and
    determining a user identification associated with the user based on the identity feature.

2. The method of claim 1, wherein determining the trip of the user based on the movement path and travel information of the vehicle comprises:
    determining an end of the trip in response to a geographic location inputted by the user.

3. The method of claim 1, further comprising:
    associating the trip of the user with the user identification.

4. A vehicular device for a public transportation, comprising:
    an image acquisition device configured to acquire a first global image in the vehicle;
    an onboard computer configured to perform the following steps:

determining a tracking feature of the user according to the first global image;
determining a movement path of the user in the vehicle according to the tracking feature and at least one second global image in the vehicle;
determining the trip of the user based on the movement path and travel information of the vehicle,
wherein determining the movement path of the user in the vehicle according to the tracking feature and at least one second global image in the vehicle comprises:
for each of the at least one second global image, identifying a location of the user in the vehicle in the second global image based on the tracking feature,
determining the movement path of the user in the vehicle by using user locations respectively identified in each of the at least one second global image,
wherein determining the trip of the user based on the movement path and travel information of the vehicle comprises:
determining a first location at which the vehicle resides when the first global image is acquired as a start of the trip of the user, and
determining an end of the trip to be a second location at which the vehicle resides when the movement path of the user terminates in the vehicle, and
wherein the onboard computer is further configured to:
acquire a local image of the user in the vehicle;
determine an identity feature of the user based on the local image; and
determine a user identification associated with the user based on the identity feature.

5. The vehicular device according to claim 4, wherein determining the trip of the user based on the movement path and travel information of the vehicle comprises:
determining an end of the trip in response to a geographic location inputted by the user.

6. The vehicular device of claim 4, wherein the onboard computer is further configured to:
associate the trip of the user with the user identification.

7. An electronic device, comprising a memory, a processor, and a program stored on the memory and executable on the processor, wherein steps of the method of claim 1 are implemented when the processor executes the program.

8. A non-transitory computer-readable storage medium having stored thereon a computer program, wherein steps of the method of claim 1 are implemented when the program is executed by a processor.

9. The method of claim 1, wherein the first global image is an image in which an overall condition in the vehicle can be captured.

10. The method of claim 1, further comprising:
determining the user's identification based on the local image by taking the local image of the user at a go-aboard position.

11. The method of claim 1, further comprising:
determining the trip of the user and settlement may be further performed for the determined trip of the user.

12. The method of claim 11, further comprising:
determining a fare based on the determined trip of the user and the fare to be paid is sent to the user terminal of the user.

* * * * *